Aug. 11, 1936.　　　　O. TOPLIFF　　　　2,050,903
AIRPLANE DRIVE
Filed Nov. 19, 1934
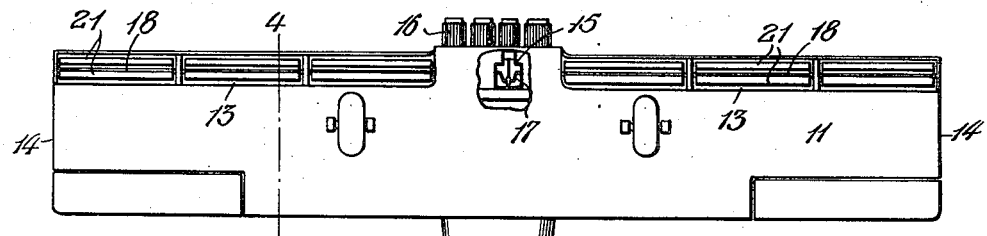
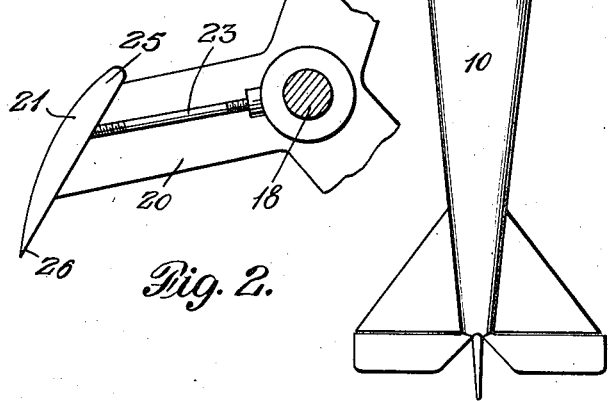
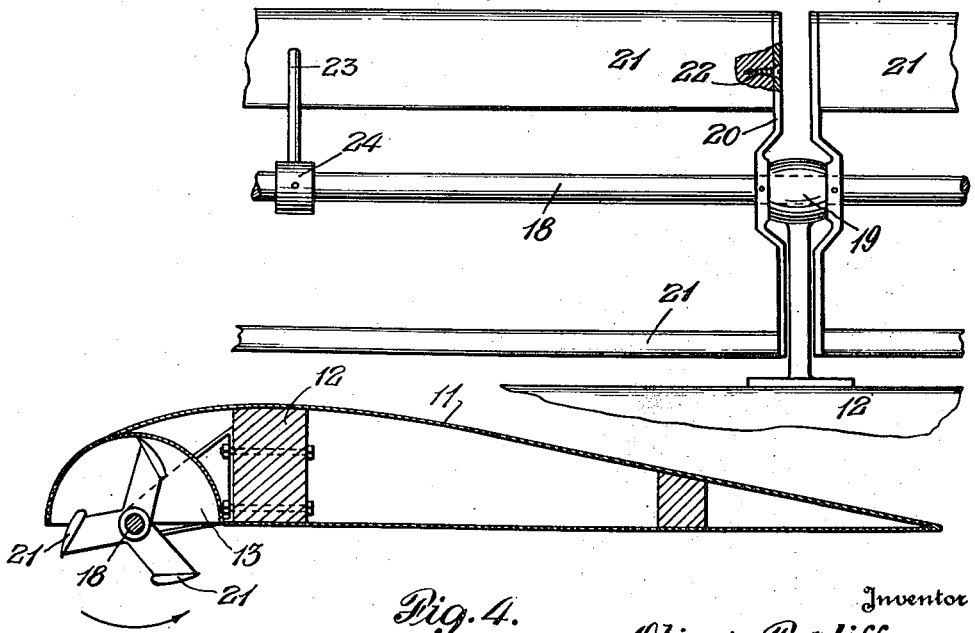
Inventor
Oliver Topliff, Patented Aug. 11, 1936

2,050,903

UNITED STATES PATENT OFFICE 2,050,903

AIRPLANE DRIVE

Oliver Topliff, Springfield, Ill.

Application November 19, 1934, Serial No. 753,753

4 Claims. (Cl. 244—25)

This invention relates to an airplane drive, in which a transverse rotor cooperates aerodynamically with a fixed wing creating thereby a propelling thrust. I have found that rotating a plurality of bodily separated vanes in a semicircular transverse groove of a wing near its landing edge, so that through a portion of its circular path the vanes are protected by the wing from the impact of the air but that through the remaining portion of the circular path the vanes interact freely with the air, does create a strong backflow of air. This backflow will be the cause of a propelling action on the airplane, obtained with an economic engine speed, in absence of any excessive noise such as conventional propellers are subjected to, without obstruction to the vision of the pilot and to the path of machine gun bullets, and without danger of a bystander being struck and hurt when the airplane is on the ground.

It is accordingly the object of this invention to provide for an airplane drive comprising a transverse rotor positioned in a transverse groove of a wing, particularly near its leading edge.

It is another object to provide for such drive in which the rotor comprises vanes, preferably wing section contoured, fixed and in spaced relation to the rotor shaft and to each other.

A still other object of this invention is to provide for such drive in which a power driven rotor cooperates, primarily in aerodynamic respect, with a wing.

These and other desirable objects and advantages of the present invention will be illustrated in the accompanying drawing and described in the specification, a certain preferred embodiment being disclosed by way of illustration only; for, since the underlying principle may be incorporated in other specific devices it is not intended to be limited to the one here shown except as such limitation is clearly imposed by the appended claims.

In the drawing, like numerals refer to similar parts throughout the different views, of which—

Fig. 1 represents the bottom view of an airplane driven according to the invention, Fig. 2 represents a partial cross-section through the rotor.

Fig. 3 represents a partial longitudinal section through the rotor, and

Fig. 4 represents a cross-section through the wing and rotor on the line 4—4 of Fig. 1.

In Fig. 1 there is shown a low-wing monoplane conventional in all respects except for the drive. The fuselage 10 with its ordinary space for the occupants and the cargo and with the usual airplane tail is fastened on top of the wing 11. There are spared out of the wing, in front of the front spar 12, grooves 13 with an almost semicircular cross-section, open to below, one groove on each side extending from the wing tip 14 to the centrally located engine 15, which latter is fastened to the spar 12. The air cooled engine 15 possesses a plurality of ribbed horizontal cylinders 16 with heads projecting out of the front of the wing facing the wind. Its crankshaft 17 is thus seen to be transversely arranged, and the axis thereof coincides with the axis of the circular cylinder a portion of which forms the roof and sidewalls of the grooves 13.

Coupled to the engine shaft 17, at its two ends are the two rotor shafts 18, supported by bearings 19 fastened to the front spar 12. Spoked flanges 20 are fixed to shaft 18 holding rigidly in place the wing section contoured vanes 21; one pair of flanges for each unsupported length of the shaft 18. In Fig. 3, the vanes are shown to be screwed to the members 20 by means of the screws 22; any other suitable means of fastening may likewise be used. Left and right hand threaded bolts 23 connecting the vanes 21 with the collars 24 surrounding the shaft 18 are at last contemplated for reducing the unsupported length of the vanes 21. The propelling rotor possesses three wing section contoured vanes 21, their rounded edges 25 point into the direction of flight when the vane is under and behind the shaft 18. The rounded edge 25 is closer to the shaft 18 than the sharp edge 26. Said rounded edge and sharp edge are well known characteristics of wing section contours and are generally designated in the art as leading edge 25 and trailing edge 26 respectively. In the present instance these latter terms are avoided as being apt to mislead because edge 25 is leading relative to the air motion but it is at the same time trailing with respect to the rotative motion of vane 21, as indicated by the arrow in Figure 4. Rounded and sharp take the place of what is conventionally called leading and trailing. The rotor turns front down, and Fig. 2 and Fig. 4 show clearly the vanes bodily separated from the shaft 18, being in spaced relation thereto and to each other, and show supporting members 20 and 23, which connect the vanes rigidly to the shaft; the shaft and the vanes rotating like one solid body.

I have found in model tests that the device described creates a strong backflow of air and consequently a large thrust, not only when the airplane is in motion but also when it is stationary, as when about to be started. I have found the aerodynamic effect greatly aided and intensified by the wing partially surrounding the rotor; both in combination forming together the means for aerodynamically acting on the air for the purpose of creating the desired propelling reaction.

I claim:

1. In an airplane: a transverse grooved wing; a rotor within the groove of the wing projecting thereout, said rotor comprising a shaft and a plurality of vanes having a rounded edge and an opposed sharp edge and being fixed to the shaft in spaced relation thereto and to each other; and power means for driving said rotor so that said vanes are rotated with their rounded edges trailing.

2. In an airplane: a wing transversely grooved at its bottom; a rotor within the groove of the wing projecting thereout, said rotor comprising a shaft and a plurality of vanes having a rounded edge and an opposed sharp edge and being fixed to the shaft in spaced relation thereto and to each other so that near its highest position each vane points with its sharp edge into the direction of flight; and power means for driving said rotor with its upper side moving in the direction of flight.

3. In an airplane: a wing transversely grooved at its bottom near its leading edge; a rotor within the groove of the wing projecting thereout, said rotor comprising a shaft and a plurality of vanes having a rounded edge and an opposed sharp edge and being fixed to the shaft in spaced relation thereto and to each other so that near its highest position each vane points with its sharp edge into the direction of flight; and power means for driving said rotor with its upper side moving in the direction of flight.

4. In an airplane: a wing with a straight transverse groove, the wall of which constituting a portion of a circular cylinder; a rotor within said groove in concentric relation to said cylinder and projecting out of the groove, said rotor comprising a shaft and a plurality of vanes having a rounded edge and an opposed sharp edge and being fixed to the shaft in spaced relation thereto and to each other; and power means for driving said rotor so that said vanes are rotated with their rounded edges trailing.

OLIVER TOPLIFF.